April 7, 1931. L. H. BARUH 1,799,774
HANDLE MEMBER FOR AUTOMOBILE STEERING WHEELS
Filed April 19, 1928
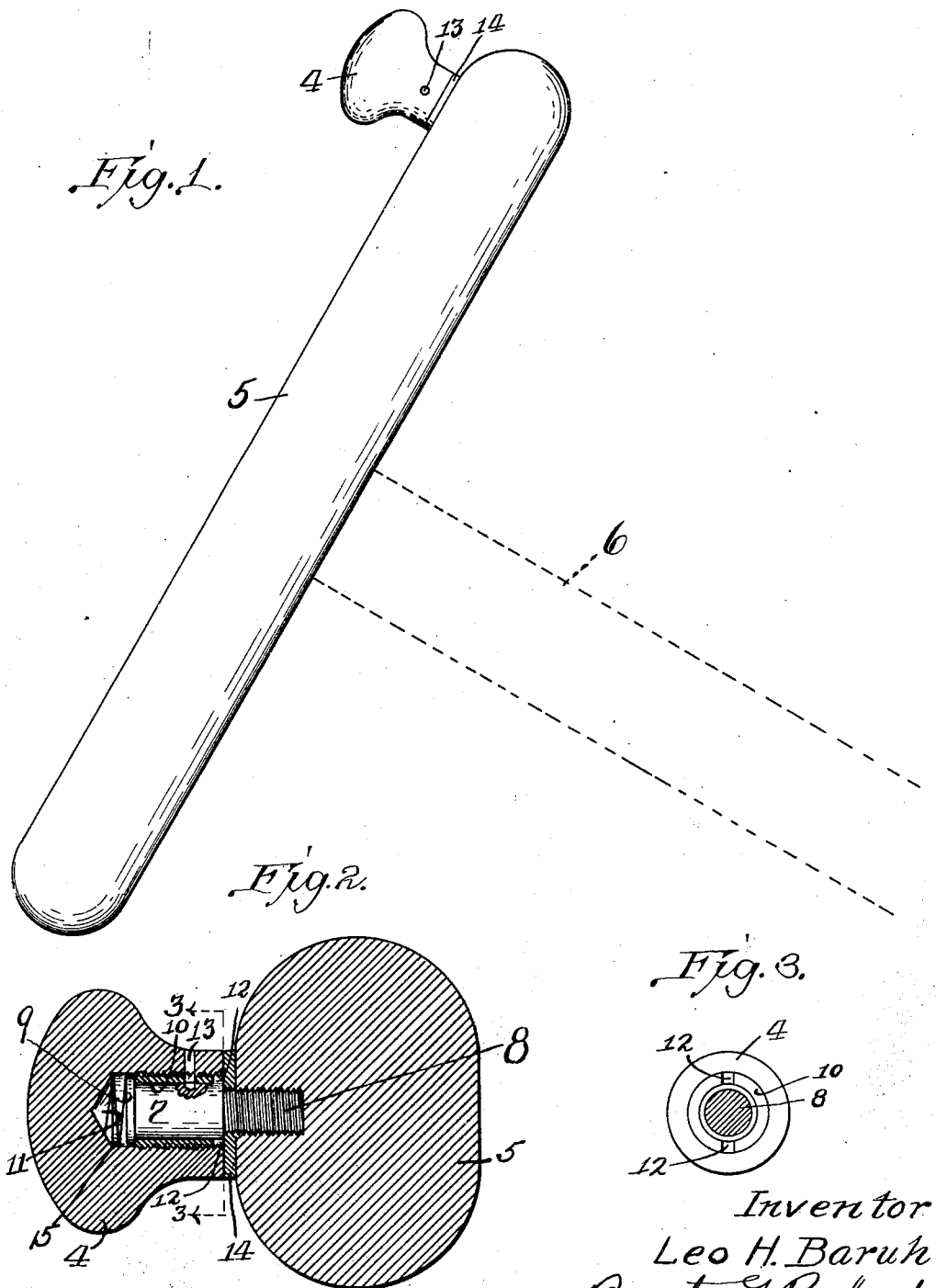
Inventor
Leo H. Baruh
By Brayton T. Richards
Attorney Patented Apr. 7, 1931

1,799,774

UNITED STATES PATENT OFFICE

LEO H. BARUH, OF PORTLAND, OREGON

HANDLE MEMBER FOR AUTOMOBILE STEERING WHEELS

Application filed April 19, 1928. Serial No. 271,149.

The present invention relates to automobile steering wheels and has for its primary object the provision of an improved attachment for automobile steering wheels greatly facilitating the manipulation thereof.

Another object of the invention is to provide a device of this character which may be readily attached to any ordinary automobile steering wheel.

Another object of the invention is the provision of a device of this character adapted and arranged to be readily secured to the ordinary steering wheel of an automobile, and so mounted as to prevent loosening thereof during use.

And other objects will appear hereafter.

The invention consists in the combinations and arrangements of parts hereinafter described and claimed.

The invention will be best understood by reference to the accompanying drawings forming a part of this specification, and in which, Fig. 1 is a side view of an automobile steering wheel equipped with an attachment embodying the invention.

Fig. 2 is an enlarged detail section of the same, and

Fig. 3 is a section taken substantially on line 3—3 of Fig. 2.

The preferred form of construction illustrated in the drawings comprises an operating handle or knob 4, preferably of wood, and adapted and arranged to be attached to the top of an ordinary steering wheel 5, mounted on an ordinary steering post 6 of an automobile. To facilitate the mounting of the handle member 4 on the steering wheel 5, a supporting stud is provided having a central cylindrical body 7 provided with a threaded reduced extension or nipple 8, as indicated. The body 7 is also provided at its other end with an enlarged retaining head 9.

The handle member 4 is provided with a metallic sleeve or bushing 10, threaded into a socket or recess 11 in the inner end thereof, said bushing fitting loosely over the stud body 7, as shown. At its exposed end the bushing 10 is provided with diametrically disposed notches 12 for engagement by a tool in inserting or removing the same from the handle member 4. A lateral opening 13 is extended through the neck of the handle member 4, sleeve 10 and into the body 7, for the reception of a pin serving to lock said members together to facilitate turning of the body 7 in applying the same to or removing the same from the steering wheel 5.

In applying the attachment to a steering wheel, the bushing 10 is first placed over the stud body 7 and said bushing is then inserted in the socket 11, as indicated, the notches 12 serving as a means for engagement of said bushing by a tool in the nature of a spanner wrench to facilitate such insertion. Then a washer 14 is placed over the nipple 8 and said nipple is secured in place on the steering wheel by threading the same into a suitable socket provided in the rim of the wheel, as shown.

In accomplishing this, a pin may be inserted through the opening 13 to engage the body 7, as will be readily understood, said inserted pin serving as a lever for turning the body 7 in forcing the threads of the nipple 8 into the socket in the wheel rim 5. When the inserted pin is removed, the handle member 4 will be securely and permanently locked in place and free to turn loosely upon the stud body 7. By this arrangement the driver of the automobile, by grasping the knob or handle member 4, may readily turn or manipulate said steering wheel without danger of losing his grip, which result is greatly facilitated by means of the loose mounting of the handle member 4 on the stud 7. The free rotation of the handle member 4 on the stud 7 also prevents unscrewing or loosening of the attachment with the wheel rim during use. It will be noted in the arrangement specified there is, or may be, slight play between the handle member 4 and the stud body 7. To compensate for this and prevent all rattle, a coiled wire spring 15 is inserted in the bottom of the recess 11, as indicated, and which will prevent all rattle during use.

While I have illustrated and described the preferred form of construction for carrying my invention into effect, this is capable of variation and modification without departing from the spirit of the invention. I therefore do not wish to be limited to the precise details disclosed, but desire to avail myself of such variations and modifications as fall within the scope of the appended claims.

Having thus described my invention, what I claim as new and desire to secure by Letters Patent is:—

1. The combination with the steering wheel of an automobile, of a handle member in the form of a wooden knob having a central recess therein; a metallic bushing threaded in said recess, the outer end of said bushing being provided with diametric notches to facilitate manipulation thereof; a headed stud held in said recess by said bushing and freely rotatable therein, there being a lateral opening extending through the neck of said knob, said bushing and into said stud for the insertion of a pin to engage said stud; a threaded nipple projecting from said stud and adapted and arranged to be threaded in the rim of said wheel; and a washer interposed between the inner end of said handle member and said wheel rim.

2. The combination with the steering wheel of an automobile, of a handle member in the form of a knob having a central socket therein, the walls of said socket being threaded; a metallic bushing fitting into said socket, the exterior walls of said bushing being threaded to fit the threads of said socket; a headed stud held in said socket by said bushing and loosely rotating therein, said stud, bushing and knob being provided with registering openings for the insertion of a tool to lock the same together; and a threaded nipple on said stud threaded in the rim of said steering wheel.

In testimony whereof, I have signed the foregoing specification.

LEO H. BARUH.